United States Patent
Fang et al.

(10) Patent No.: US 12,301,791 B2
(45) Date of Patent: May 13, 2025

(54) METHOD AND SYSTEM FOR INTRA-PREDICTION

(71) Applicant: ZHEJIANG DAHUA TECHNOLOGY CO., LTD., Hangzhou (CN)

(72) Inventors: Cheng Fang, Hangzhou (CN); Dong Jiang, Hangzhou (CN); Jucai Lin, Hangzhou (CN); Jun Yin, Hangzhou (CN); Feiyang Zeng, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 265 days.

(21) Appl. No.: 17/837,081

(22) Filed: Jun. 10, 2022

(65) Prior Publication Data

US 2022/0303527 A1     Sep. 22, 2022

Related U.S. Application Data

(63) Continuation of application No. PCT/CN2020/136034, filed on Dec. 14, 2020.

(30) Foreign Application Priority Data

Dec. 13, 2019   (CN) .......................... 201911289240.7

(51) Int. Cl.
*H04N 19/105*   (2014.01)
*H04N 19/132*   (2014.01)
(Continued)

(52) U.S. Cl.
CPC ......... *H04N 19/105* (2014.11); *H04N 19/132* (2014.11); *H04N 19/159* (2014.11); *H04N 19/176* (2014.11); *H04N 19/182* (2014.11)

(58) Field of Classification Search
CPC .... H04N 19/105; H04N 19/11; H04N 19/132; H04N 19/159; H04N 19/176; H04N 19/182; H04N 19/59; H04N 19/593
See application file for complete search history.

(56) References Cited

U.S. PATENT DOCUMENTS

2015/0070469 A1   3/2015   Yoshibayashi et al.
2022/0014752 A1*  1/2022   Deng .................... H04N 19/11

FOREIGN PATENT DOCUMENTS

CN    104702962 A    6/2015
CN    109076243 A    12/2018
(Continued)

OTHER PUBLICATIONS

Jianle Chen—Algorithm description for Versatile Video.
(Continued)

*Primary Examiner* — Dakshesh D Parikh

(57) ABSTRACT

A method for intra-prediction is provided, including: determining at least one reference line of a current coding block, each of the at least one reference line comprising a plurality of first reference pixels; down-sampling the at least one reference line and obtaining a plurality of second reference pixels; performing matrix multiplication for the plurality of second reference pixels and obtaining a reference matrix; and obtaining a matrix-based intra-prediction block of the current coding block based on the reference matrix and the plurality of first reference pixels, the matrix-based intra-prediction block comprising a plurality of first pixels and a plurality of second pixels, a value of each of the first pixels is a value of a corresponding pixel in the reference matrix, and a value of each of the second pixels is obtained based on values of the first pixels and values of the first reference pixels.

18 Claims, 8 Drawing Sheets

(51) Int. Cl.
*H04N 19/159* (2014.01)
*H04N 19/176* (2014.01)
*H04N 19/182* (2014.01)

(56) References Cited

FOREIGN PATENT DOCUMENTS

| CN | 109803145 A | 5/2019 |
|---|---|---|
| CN | 111050183 A | 4/2020 |
| WO | WO2020239017 A1 | 12/2020 |

OTHER PUBLICATIONS

Description of Core Experiment 3—Intra Prediction and Mode Coding.
CE3—Affine linear weighted intra prediction.
Non-CE3 Removal of leaving out operation for 4x16 and 16x4 MIP blocks.
International search report, International Application No. PCT/CN2020/136034, mailed Mar. 11, 2021.
Chinese First Office Action, Chinese Application No. 201911289240.7, mailed Jul. 28, 2021 (118 pages).
Notification to Grant Patent Right for Invention, Chinese Application No. 201911289240.7, mailed Mar. 3, 2022 (3 pages).
Written Opinion of the International Search Authority, International Application No. PCT/CN2020/136034.
European Partial Search Report, Application No. 20899038.2, mailed Dec. 14, 2022 (16 pages).

\* cited by examiner

METHOD AND SYSTEM FOR INTRA-PREDICTION

CROSS REFERENCE TO RELATED APPLICATIONS

The present application is a continuation-application of International (PCT) Patent Application No. PCT/CN2020/136034, filed on Dec. 14, 2020, which claims priority of Chinese Patent Applications No. 201911289240.7, filed on Dec. 13, 2019, the entire contents of which are hereby incorporated by reference.

TECHNICAL FIELD

The present disclosure relates to the field of video encoding and decoding technologies, and more particularly, to a method and a system for intra-prediction.

BACKGROUND

Since the amount of video image data is relatively large, it is usually necessary to compress video pixel data, thereby reducing the amount of video data. The compressed data is called a video stream. The video stream is transmitted to a user terminal through a wired or wireless network, and then decoded for viewing, which can reduce a network bandwidth and storage space during transmission.

The video coding process includes prediction, transformation, quantization, and coding. The prediction is divided into an intra-prediction and an inter-frame prediction. The intra-prediction is to predict a value of a current pixel according to values of a pixel around the current pixel (i.e., a reference pixel) within a frame of image. Generally, the corresponding reference pixel is found on a reference line of the current pixel according to a direction pointed by a prediction mode. A value with smallest replacement value is selected as the predicted value of the current pixel. The current intra-prediction technology includes multiple intra-prediction modes. Matrix Based Intra Prediction (MIP) is an intra-prediction mode to obtain the final predicted value by multiplying the reference pixel after down-sampling by a specific matrix and then linearly interpolating. In the existing prediction using the MIP mode, the information of the applied reference pixel is single, and more image information is lost, resulting in a low prediction accuracy.

SUMMARY OF THE DISCLOSURE

The present disclosure provides a method and a system for intra-prediction to improve a prediction accuracy.

The present disclosure provides a method for intra-prediction, including: determining at least one reference line of a current coding block, each of the at least one reference line comprising a plurality of first reference pixels; down-sampling the at least one reference line and obtaining a plurality of second reference pixels; performing matrix multiplication for the plurality of second reference pixels and obtaining a reference matrix; and obtaining a matrix-based intra-prediction block of the current coding block based on the reference matrix and the plurality of first reference pixels, the matrix-based intra-prediction block comprising a plurality of first pixels and a plurality of second pixels, a value of each of the first pixels is a value of a corresponding pixel in the reference matrix, and a value of each of the second pixels is obtained based on values of the first pixels and values of the first reference pixels. To address the above technical problems, the present disclosure provides an encoder, including a processor for executing instructions to perform the foregoing intra-prediction method.

The present disclosure provides a computer-readable storage medium, storing instructions or program data to be executed to perform the foregoing intra-prediction method.

BRIEF DESCRIPTION OF THE DRAWINGS

To further illustrate technical solutions of embodiments of the present disclosure, drawings needed for description of the embodiments will be briefly introduced. Obviously, the following drawings are only some embodiments of the present disclosure. To any one of skill in the art, other drawings may be obtained without any creative work based on the following drawings.

DETAILED DESCRIPTION

To make purposes, technical solutions and effects of the present disclosure clearer, the present disclosure will be described in further detail with reference to the accompanying drawings and embodiments.

Figure 1:
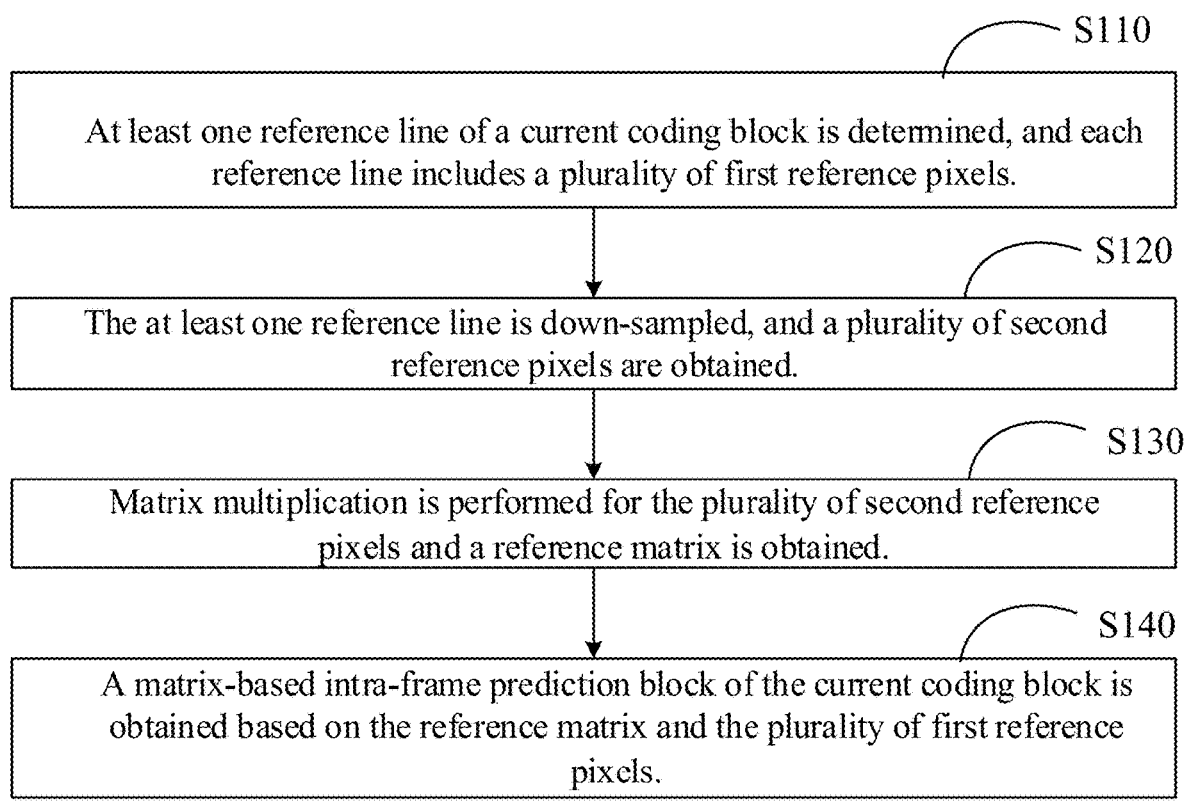
FIG. 1 is a flow chart of a method for intra-prediction according to a first embodiment of the present disclosure.
Figure 2:
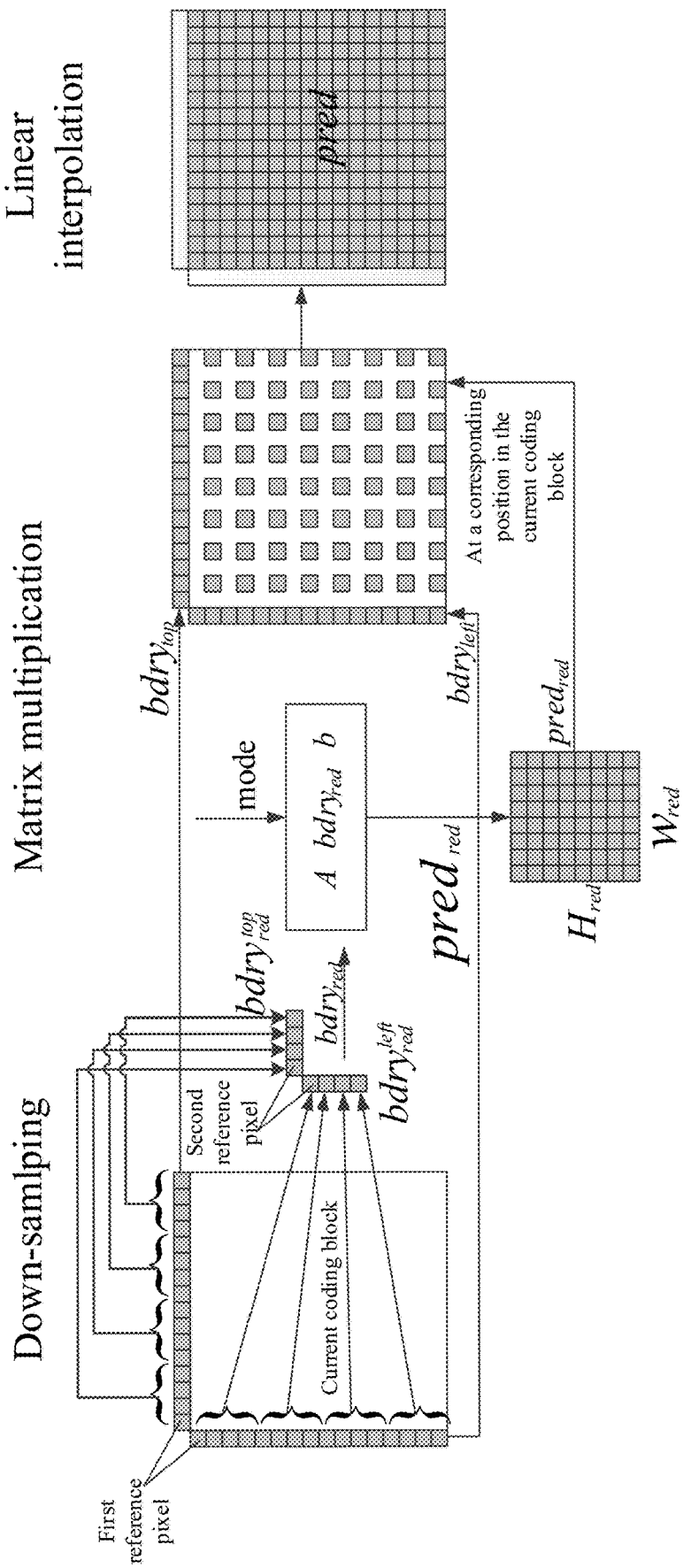
FIG. 2 is a flow chart of a method for intra-prediction according to a second embodiment of the present disclosure.

As shown in FIG. 1 and FIG. 2. FIG. 1 is a flow chart of a method for intra-prediction according to a first embodiment of the present disclosure. FIG. 2 is a flow chart of a method for intra-prediction according to a second embodiment of the present disclosure. It should be noted that if there are substantially the same results, the embodiment is not limited to the sequence of the flow shown in FIG. 1. The embodiment may include operations at blocks illustrated in FIG. 1.

At block S110: At least one reference line of a current coding block is determined, and each reference line includes a plurality of first reference pixels.

Figure 3:
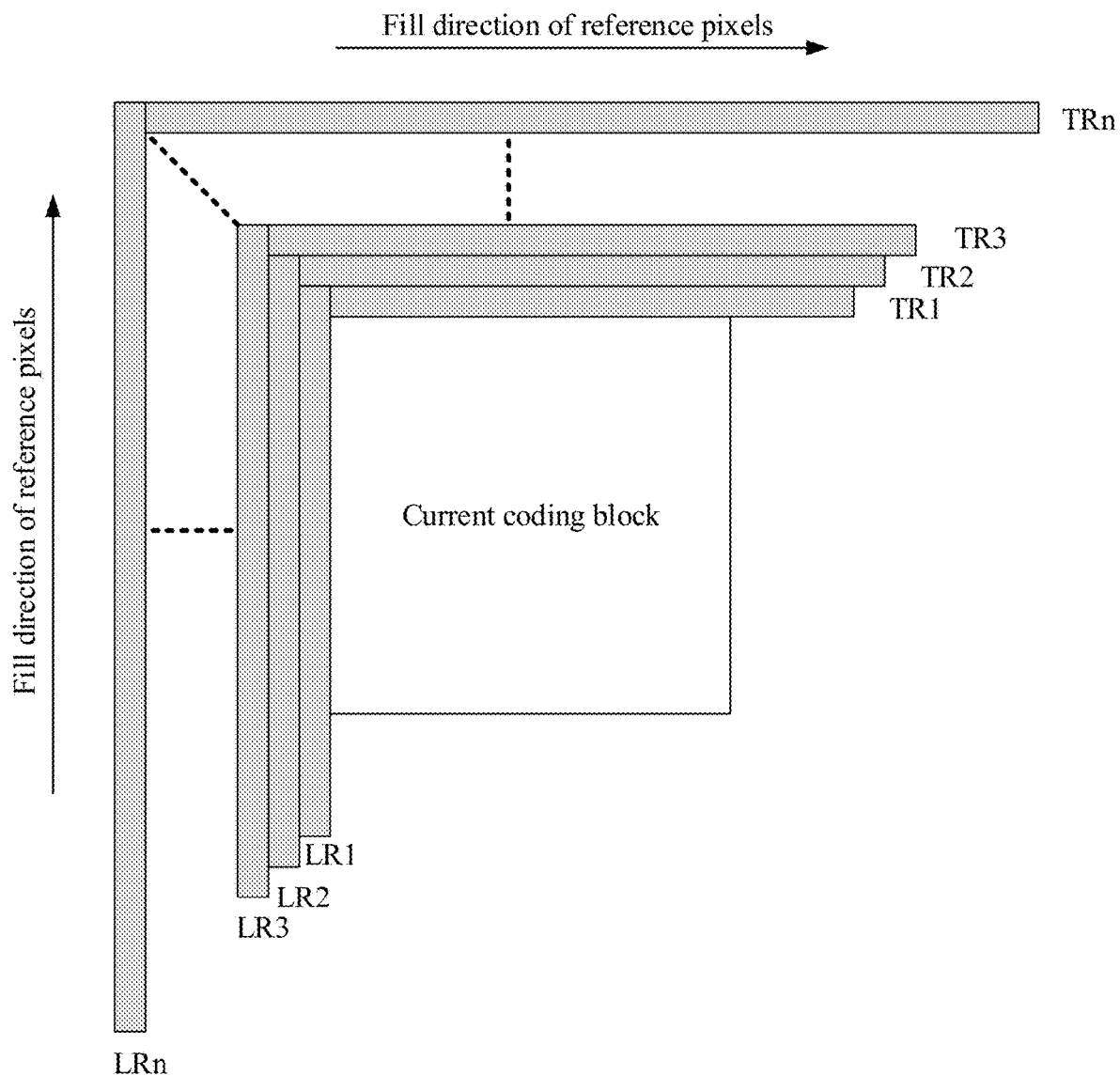
FIG. 3 is a schematic view of a reference line of a current coding block according to an embodiment of the present disclosure.

As shown in FIG. 3, FIG. 3 is a schematic view of a reference line of a current coding block according to an embodiment of the present disclosure. A plurality of reference lines (TR1, TR2, TR3 . . . TRn, LR1, LR2, LR3 . . .

LRn) are configured on the top and to the left of the current coding block for obtaining reference pixels. The first reference pixel may be obtained on each reference line of the current coding block according to a direction indicated by a prediction mode. The number of the first reference pixel may be more than one.

At block S120: The at least one reference line is down-sampled, and a plurality of second reference pixels are obtained.

The plurality of first reference pixels may be divided into multiple groups according to the number of the second reference pixels. Each group of first reference pixels corresponds to a second reference pixel. A weighted average value of the values of each group of first reference pixels may be configured as the value of the corresponding second reference pixel.

At block S130: Matrix multiplication is performed for the plurality of second reference pixels and a reference matrix is obtained.

A partial prediction value of the current coding block may be obtained based on the reference matrix.

After the down-sampling is completed, the second reference pixels obtained after the down-sampling may be lined up and multiplied with a specific matrix as a 1×M (where M is the number of second reference pixels) to obtain the reference matrix. The specific matrix is selected from a total of 34 matrices according to the size of the current coding block and the Matrix Based Intra Prediction (MIP) mode. All the matrices may be divided into 3 matrix sets $S_{idx}$, where idx may be 0, 1, or 2. The Set $S_0$ includes 16 matrices $A_0^i$, where i∈{0, . . . , 15}. The Set $S_1$ includes 8 matrices $A_1^i$, where i∈{0, . . . , 7}. The Set $S_2$ includes 6 matrices $A_2^i$, where i∈{0, . . . , 5}. A specific set to which the current coding block belongs may be determined according to a formula (1).

$$idx(W, H) = \begin{cases} 0 & W = H = 4 \\ 1 & \text{else if } W \times H \leq 64 \\ 2 & \text{else} \end{cases} \quad (1)$$

where W refers to a width of the current coding block, and H refers to a height of the current coding block.

After which set the current coding block belongs to is determined, it is also necessary to determine which matrix is specifically selected, that is, the value of i shall be determined. The value of i may be determined according to the current MIP mode. "mode" is used to indicate the current MIP mode.

$$i = \begin{cases} \text{mode} & \text{for } W = H = 4 \text{ and mode} < 16 \\ \text{mode}-16 & \text{for } W = H = 4 \text{ and mode} \geq 16 \\ \text{mode} & \text{for } W \times H \leq 64 \text{ and mode} < 8 \\ \text{mode}-8 & \text{for } W \times H \leq 64 \text{ and mode} \geq 8 \\ \text{mode} & \text{else and mode} < 6 \\ \text{mode}-6 & \text{else and mode} \geq 6 \end{cases}$$

After the value of i is determined, the selected matrix may be finally determined. Then the multiplication operation may be performed according to a formula (2).

$$pred_{red} = A \cdot bdry_{red} + b \quad (2)$$

where A refers to the selected matrix, $bdry_{red}$ refers to the values of the second reference pixels after down-sampling, b refers to an offset parameter, and $pred_{red}$ refers to the partial predicted value obtained. The value of b is also determined according to the value of i. In other embodiments, the matrix may also be selected in other ways, and the number of the selected matrix may be one or more.

At block S140: A matrix-based intra-prediction block of the current coding block is obtained based on the reference matrix and the plurality of first reference pixels.

After the matrix multiplication, only part of the prediction value of the current coding block may be obtained based on the reference matrix. The prediction value of remaining positions is required to be obtained by linear interpolation based on the existing prediction value (value of the pixels in the reference matrix) and the original reference pixel. That is, the matrix-based intra-prediction block of the current coding block includes a plurality of first pixels and a plurality of second pixels. A value of each of the first pixels is a value of a corresponding pixel in the reference matrix. A value of each of the second pixels is obtained based on values of the first pixels and values of the first reference pixels. The values of the first pixels and the values of the second pixels are combined to obtain the predicted value of the current coding block.

In the embodiment, when the intra-prediction is performed with the MIP mode, more reference pixel information on more reference lines is applied during down-sampling, such that more image information may be obtained, improving the accuracy of prediction.

Figure 4:
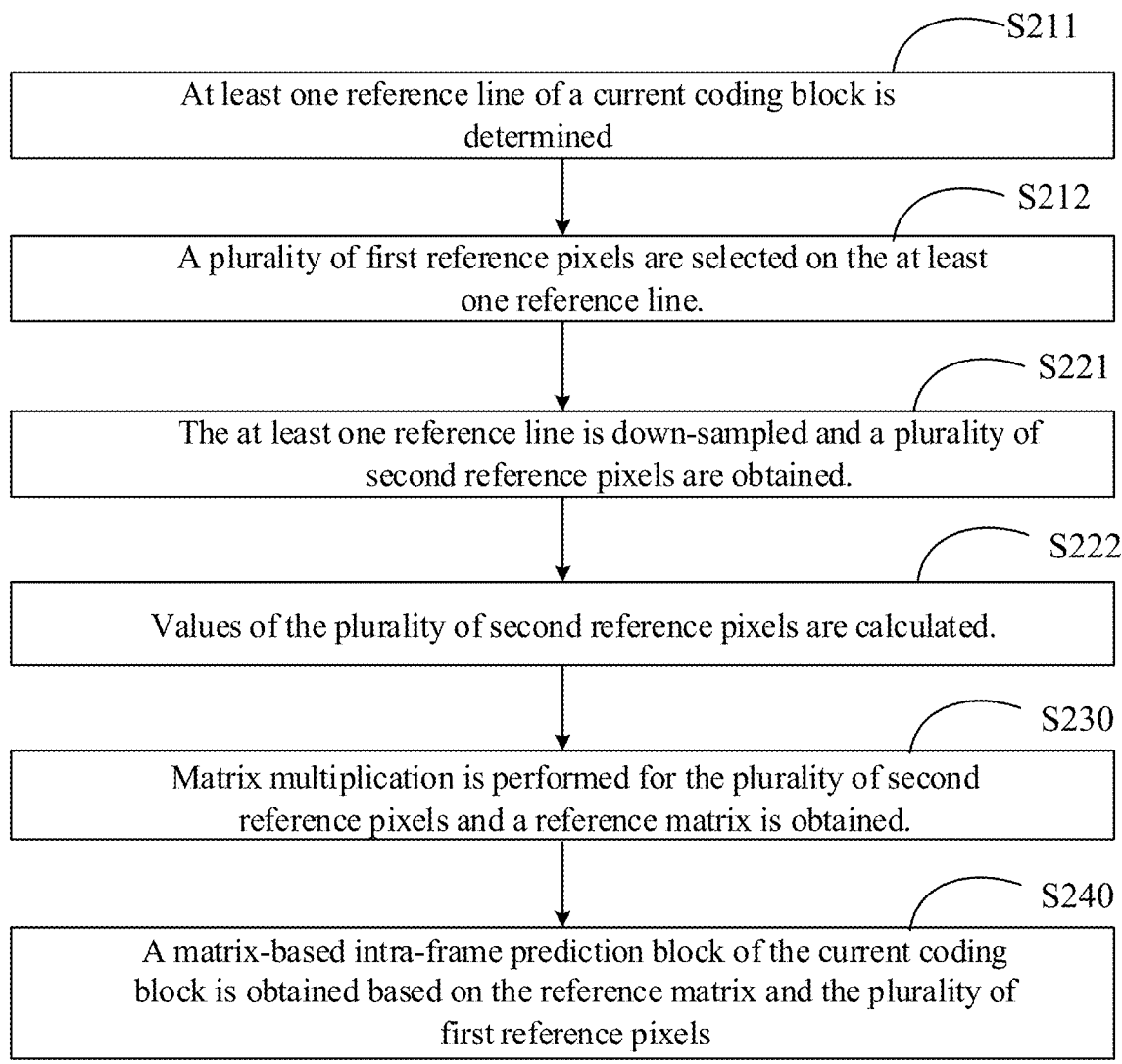
FIG. 4 is a flow chart of a method for intra-prediction according to a third embodiment of the present disclosure.

As shown in FIG. 4, FIG. 4 is a flow chart of a method for intra-prediction according to a third embodiment of the present disclosure. It should be noted that if there are substantially the same results, the embodiment is not limited to the sequence of the flow shown in FIG. 4. The embodiment may include operations at blocks illustrated in FIG. 4.

At block S211: At least one reference line of a current coding block is determined.

In the embodiment, L (L=1, 2 . . . ) reference lines may be applied for down-sampling. A complete reference line includes a part located on the top of the current coding block and a part located on the left side of the current coding block. The at least one selected reference line during sampling may be the complete reference line or an incomplete reference line with only a part. For example, the selected reference line may only be a part located on the top of the current coding block or below the current coding block. The at least one selected reference line includes at least a first reference line adjacent to the current coding block, and the first reference line is complete.

The greater the number of the reference lines, the more beneficial it is to improve the accuracy of prediction, which will also increase the amount of calculation. Therefore, the number of the reference lines may be determined according to the size of the current coding block. The number of the reference lines used may be determined in any of the following ways.

In some embodiments, in response to the area of the current coding block (W×H) being less than a first threshold (Th1), the number of the reference lines is 1, otherwise the number of the reference lines is greater than 1.

In some embodiments, in response to the width of the current coding block being less than a second threshold (Th2), the number of reference lines on the left side of the current coding block is 1, otherwise, the number of the reference lines on the left side of the current coding block is greater than 1. In response to the height of the current coding block being less than a third threshold (Th3), the number of reference lines on the top of the current coding block is 1, otherwise, the number of the reference lines on the top of the current coding block is greater than 1. The first threshold (Th1), the second threshold (Th2), and the third threshold (Th3) may be the same or different.

In some embodiments, a syntax element may be added to a sequence parameter set (SPS) with coding standard to indicate whether to apply a single reference line or multiple reference lines for down-sampling, thereby controlling a complexity of down-sampling.

At block S212: A plurality of first reference pixels are selected on the at least one reference line.

A row of pixels on at least one reference line on the top of the current coding block and/or a column of pixels on at least one reference line on the left side may be configured as the first reference pixels. The number of the first reference pixels in a row is consistent with the width of the current coding block. The number of the first reference pixels in a column is consistent with the height of the current coding block.

At block S221: The at least one reference line is down-sampled and a plurality of second reference pixels are obtained.

The plurality of first reference pixels may be divided into multiple groups according to the number of the second reference pixels. Each group of first reference pixels corresponds to a second reference pixel. The numbers of the first reference pixels belonging to different reference lines in the same group are the same. The first reference pixels belonging to the same reference line are continuously distributed.

Assuming that the current encoding block is a W×H block, and assuming that $bdry_{size}=bdry_{red}^{top}=bdry_{red}^{left}$, where $bdry_{red}^{top}/bdry_{red}^{left}$ represent the number of second reference pixels obtained after down-sampling of the first reference pixels on the top/left of the current encoding block. The first reference pixels may be down-sampled in any of the following ways.

Figure 5:
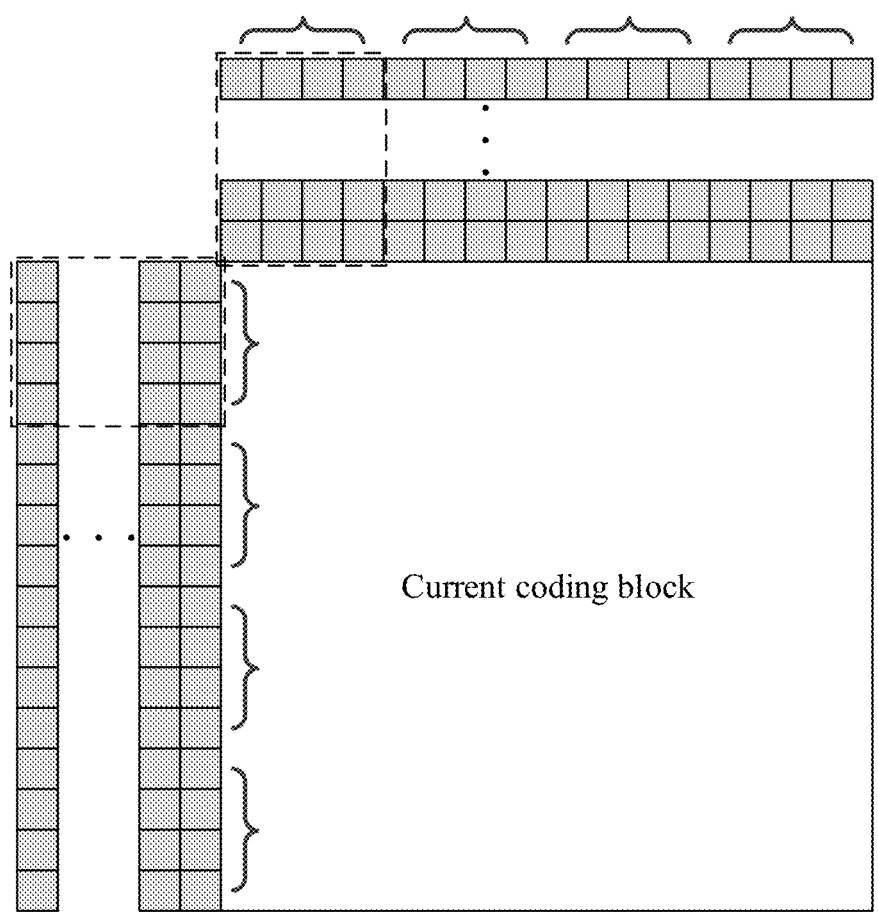
FIG. 5 is a schematic view of a down-sampling with multiple reference lines according to an embodiment of the present disclosure.

As shown in FIG. 5, FIG. 5 is a schematic view of a down-sampling with multiple reference lines according to an embodiment of the present disclosure. In the embodiment, L (L=1, 2 . . . ) reference lines are selected. $L \times W/bdry_{size}$ adjacent reference pixels are configured as a group for down-sampling. That is, $L \times W/bdry_{size}$ first reference pixels may be divided into a group. Each reference line in each group is configured with $W/bdry_{size}$ pixels. The numbers of first reference pixels belonging to different reference lines in the same group are the same. $W/bdry_{size}$ pixels on each reference line are continuously distributed. The first reference pixels are located directly on the top of (or on the left of) the selected pixels of the first reference line. In other embodiments, the numbers of reference lines selected on the top of and on the left of the current coding block may be different.

In other embodiments, $bdry_{size}=(idx==0)?2:4$. That is, the number of second reference pixels obtained after down-sampling of only 4×4 blocks is 2 on the top and 2 on the left. The number of second reference pixels obtained after down-sampling of blocks of other sizes is 4 on the top and 4 on the left.

In other embodiments, in response to the size of the current coding block being 4×4, the down-sampling method may be to average each two adjacent pixels, that is, to down-sample two adjacent first reference pixels as a group. The number of the second reference pixels obtained after down-sampling is 2 2 on the top and 2 on the left. In response to the size of the current coding block W×H being greater than 4×4, W/4 first reference pixels may be divided into a group and H/4 first reference pixels may be divided into a group for down-sampling. The number of second reference pixels obtained after down-sampling is on the top and 4 on the left.

In other embodiments, the down-sampling method is to average a group of n (n=W/4) and m (m=H/4) adjacent pixels, respectively. For example, in response to the size of the current coding block being 8×4, the number of the second reference pixels obtained after down-sampling is 4 on the top and 4 on the left. In response to the size of the current coding block is 16×16, the number of the second reference pixels obtained after down-sampling is 4 on the top and 4 on the left.

At block S222: Values of the plurality of second reference pixels are calculated.

A weighted average value of the values of each group of first reference pixels may be calculated separately. The weighted average value of the values of each group of first reference pixels is configured as the value of the corresponding second reference pixel. A weight may be assigned to each first reference pixel in each group in any of the following ways, and the sum of the weights of all the first reference pixels in a group is 1. The method for assigning the weight of the first reference pixels in each group may be the same or different.

In some embodiments, in each group of first reference pixels, all the first reference pixels may be assigned a same weight.

In other embodiments, the weights of the first reference pixels belonging to a same reference line may be assigned a same weight, and the weights of the first reference pixels that belong to different reference lines are inversely correlated with the distance between each of the reference lines and the current coding block.

The reference lines may be assigned weights first. A weight of each reference line is weight, and a weight of a reference line closer to the current coding block is greater. The weight of each reference line is the sum of weights of all the first reference pixels belonging to the reference line in the group. The weight of each first reference pixel in the current reference line is $weight_1/(W/bdry_{size})$.

In some embodiments, the calculating the value of the plurality of second reference pixels includes operations as followed.

First assigning weights to each reference line separately. Assuming that the total weight is $weight_{all}=1+2+\ldots+L$, the weight of the lth (l=1, 2 . . . L) reference line in an order of the distance from the current coding block from nearest to furthest is $weight_l=(L-l+1)/weight_{all}$.

When the first (l=1) and second (l=2) reference lines in the order of the distance from the current coding block are selected, the first reference line may be assigned a weight of ⅔ when down-sampling the first reference pixels on the top. Then the weight of each pixel on the first reference line is $2bdry_{size}/3W$. The second reference line may be assigned a weight of ⅓, then the weight of each pixel on the second reference line is $1bdry_{size}/3W$.

Similarly, when the first reference pixels on the left are down-sampled, the first reference line may be assigned a weight of ⅔, then the weight of each pixel on the first reference line is $2bdry_{size}/3H$ The second reference line may be assigned a weight of ⅓, then the weight of each pixel on the second reference line is $1bdry_{size}/3H$.

In other embodiments, the weights of the first reference pixels belonging to a same reference line are inversely correlated with the distance between each of the first reference pixels and a specified pixel, and different reference lines are assigned a same weight.

In a case in which the first reference pixels belonging to the same reference line in each group are horizontally distributed, the specified pixel may be the rightmost first reference pixel belonging to the same reference line. Coordinates of the horizontally specified pixels are (N×W/bdry$_{size}$−1,0), N=1, 2, . . . .

In a case in which the first reference pixels belonging to the same reference line in each group are vertically distributed, the specified pixel may be the lowermost first reference pixel belonging to the same reference line. Coordinates of the vertically designated pixels are (0, N×H/bdry$_{size}$−1), N=1, 2, . . . .

In other embodiments, the weights of all the first reference pixels may be directly configured to be inversely correlated with the distance between each of the first reference pixels and the specified pixel without assigning weights to the reference lines. The distance between pixels in a diagonal direction may be calculated with a triangle relationship.

In some embodiments, the calculating the value of the plurality of second reference pixels includes operations as followed.

In the embodiments, only one reference line is selected on the top of the current coding block. Since the principle of weight distribution of each group of first reference pixels is the same, the weight of each first reference pixel in a group may be presented with weight[x+k], where x represents the horizontal coordinate of a first pixel in each group of reference pixels (x=0, W/bdry$_{size}$, 2×W/bdry$_{size}$, . . . , W×W/bdry$_{size}$), k represents the offset of the pixel coordinates in each group (k=0, 1 . . . W/bdry$_{size}$−1). The total weight of each group is then weigh$_{all}$=1+2+ . . . +W/bdry$_{size}$. The weight of all pixels in each group is weight$_{[x+k]}$=(k+1)/weigh$_{all}$.

The reference pixels on the left are down-sampled in a similar way. Compared with the down-sampling of the reference pixels on the top, W is replaced with H, and the x coordinate is replaced with the y coordinate.

In other embodiments, the weights of the first reference pixels belonging to the same reference line may be assigned to be inversely correlated with the distance between each of the first reference pixels and the specified pixel, and the weights of different reference lines may be inversely correlated with the distance between each of the reference lines and the current coding block. That is, the closer a reference line is to the current code, the more weight is assigned to the reference line.

In other embodiments, all the first reference pixels in a single reference line may be weighted average, and a group of first reference pixels of each reference line will get a weighted average value; then the weighted average values of the reference lines are assigned different weights, and the weighted average is performed.

The weight distribution of the first reference pixels in a single reference line and the weight distribution of the weighted average value of each reference line (that is, the weight distribution of each reference line) may be selected from any of the above embodiments.

At block S230: Matrix multiplication is performed for the plurality of second reference pixels and a reference matrix is obtained.

The specific execution process may be referred to the description of the above-mentioned embodiments, which will not be repeated herein.

At block S240: A matrix-based intra-prediction block of the current coding block is obtained based on the reference matrix and the plurality of first reference pixels.

The predicted value of the matrix-based intra-prediction block may be obtained with an acquisition method in any of the following embodiments.

In the above embodiments, when the intra-prediction is performed with the MIP mode, more reference pixel information on more reference lines is applied during down-sampling, such that more image information may be obtained. Moreover, the weighting of different first reference pixels is also considered, and reference pixels are assigned different weights based on distance dependence during down-sampling, such that the accuracy of prediction may be improved.

Figure 6:
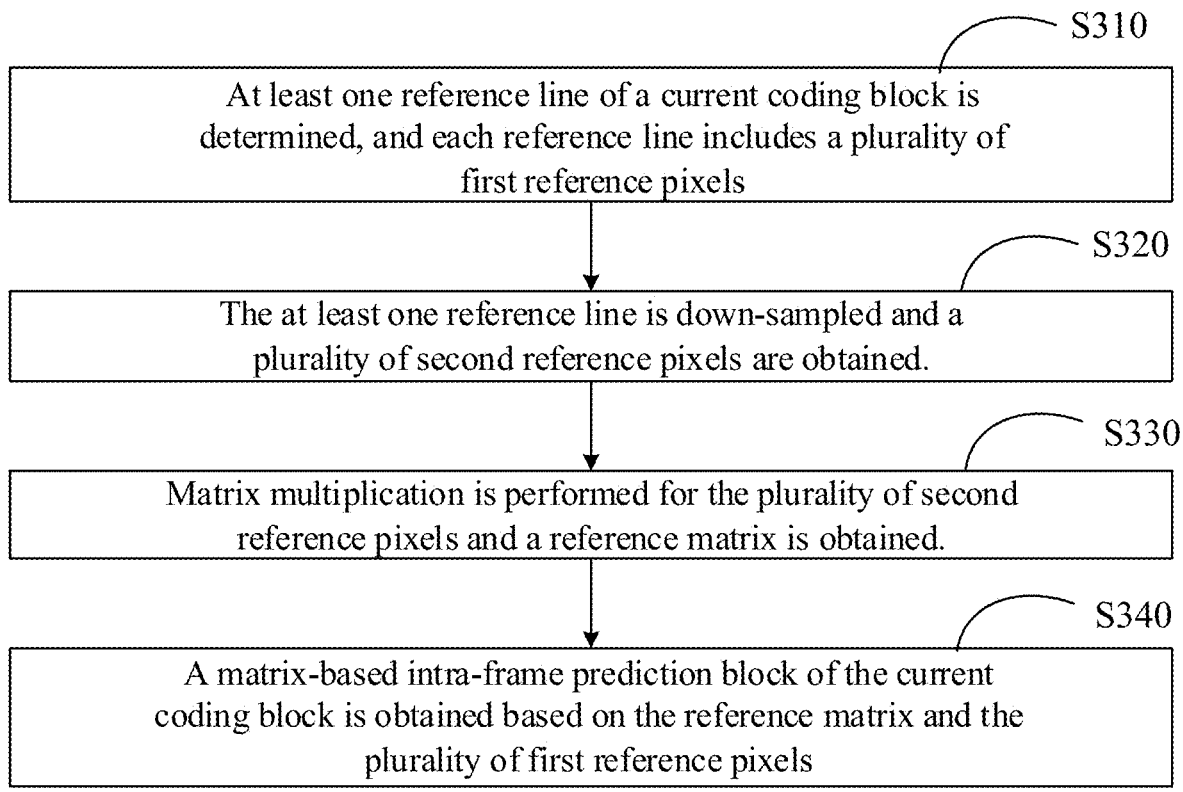
FIG. 6 is a flow chart of a method for intra-prediction according to a fourth embodiment of the present disclosure.

As shown in FIG. 6, FIG. 6 is a flow chart of a method for intra-prediction according to a fourth embodiment of the present disclosure. It should be noted that if there are substantially the same results, the embodiment is not limited to the sequence of the flow shown in FIG. 6. The embodiment may include operations at blocks illustrated in FIG. 6.

At block S310: At least one reference line of a current coding block is determined, and each reference line includes a plurality of first reference pixels.

At block S320: The at least one reference line is down-sampled and a plurality of second reference pixels are obtained.

At block S330: Matrix multiplication is performed for the plurality of second reference pixels and a reference matrix is obtained.

At block S340: A matrix-based intra-prediction block of the current coding block is obtained based on the reference matrix and the plurality of first reference pixels.

The matrix-based intra-prediction block includes a plurality of first pixels and a plurality of second pixels. The value of each of the first pixels is the value of the pixel in the reference matrix. The value of each of the second pixels is obtained based on a calculation of the values of pixels in the reference matrix and the values of the first reference pixels.

After the matrix multiplication, only part of the prediction value of the current coding block may be obtained based on the reference matrix. The prediction value of remaining positions is required to be obtained by linear interpolation based on the existing prediction value and the original reference pixel.

As shown in FIG. 2, during linear interpolation, the reference pixels involved in the interpolation operation may be obtained by directly copying the original reference pixels (i.e. the first reference pixels) and mapping the pixels (first pixels) in the reference matrix to the current coding block.

Assuming that W$_{red}$ and H$_{red}$ respectively represent the number of columns and rows of the reference matrix pred$_{red}$, the current coding block is divided into U$_{hor}$=W/W$_{red}$ row regions in the row direction, and divided into U$_{ver}$=H/H$_{red}$ column regions in the column direction. A plurality of W/W$_{red}$×H/H$_{red}$ area units are thus defined. The pixels (first pixels) in the reference matrix are mapped to the pixels at the lower right corner of each area unit.

When interpolating, a horizontal interpolation is first performed in rows and a vertical interpolation is then performed in columns. Any of the following methods may be applied to perform the interpolation.

In some embodiments, an execution start time of the interpolation operation may be adjusted to improve the operation efficiency.

In the current technology, it is necessary to complete the horizontal interpolation of all rows first, and then the vertical interpolation is performed in the columns, of which the operation efficiency is low. In the embodiments of the present disclosure, when performing vertical interpolation on a certain pixel, as long as the value of the pixel in a same column of and in a nearest row below the current pixel (the pixel to be interpolated) is obtained, the current pixel can be interpolated with the original reference pixel of the same column. With the technical solutions of the embodiments, a semi-synchronization of horizontal interpolation and vertical interpolation may be realized, improving the operation efficiency.

In other embodiments, more reference pixels may be applied for interpolation to improve interpolation accuracy.

The value of a first pixel and the value of a first reference pixel are horizontally interpolated to obtain a value of a second pixel in a same row. The second pixel in a same row is the second pixel in a same row as the first pixel (that is, horizontal interpolation). After obtaining the values of interpolation pixels (i.e., pixels1 for interpolation) of the second pixel in a different row, the values of the interpolation pixels are applied to interpolate to obtain the value of the second pixel in a different row (that is, the current pixel). The second pixel in a different row is the second pixel in a different row from the first pixel (that is, vertical interpolation). In different embodiments, different interpolation pixels may be selected correspondingly.

When the vertical interpolation is performed, two pixels on the upper and lower sides of the current pixel may be applied to participate in the interpolation. That is, interpolation pixels corresponding to the second pixel in a different row include an upper-side interpolation pixel and a lower-side interpolation pixel in a same column as the second pixel in a different row.

The upper-side interpolation pixel is a first reference pixel located on the upper side of the second pixel in a different row, an obtained closest first pixel or second pixel in a same row, or an adjacent pixel obtained. The lower-side interpolation pixel is an obtained closest first pixel or second pixel in a same row located on the lower side of the second pixel in a different row, or an adjacent pixel obtained.

When multiple pixels are selected for interpolation, the interpolation weights of two interpolation pixels (i.e. an upper-side interpolation pixel and a lower-side interpolation pixel) may be configured according to the distances between the current pixel and the two interpolation pixels. The closer the distance is, the greater the weight.

Figure 7:
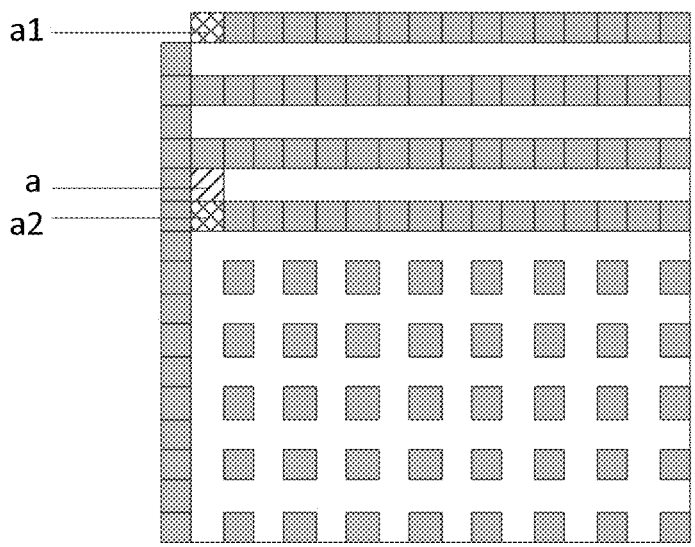
FIG. 7 is a schematic view of a linear interpolation according to a first embodiment of the present disclosure.

As shown in FIG. 2 and FIG. 7. FIG. 7 is a schematic view of a linear interpolation according to a first embodiment of the present disclosure. The interpolation operation may include operations as followed.

A parameter Y is set to represent the row of the matrix $pred_{red}$ (Y=1, 2, 3 ... $H_{red}$), and y to represent the vertical coordinate of the current coding block (the coordinate of the pixel at the upper left corner of the current coding block may be set to (0,0)). When vertical interpolation is performed on the line pixels whose ordinate is $(Y-1) \times H/H_{red}-1 <= y <= Y \times H/H_{red}-1$, the total weight is $weight_{all}=Y \times H/H_{red}$, Y=1, 2 ... $H_{red}$. When vertical interpolation is performed on the pixel closest to the upper original reference pixel, the weight of the upper original reference pixel (that is, the first reference pixel) is $(weigh_{all-y}-1)/weight_{all}$, and the weight of the below pixel obtained is $(y+1)/weigh_{all}$. When it is necessary to interpolate the pixels in order from top to bottom, the weight of the upper original reference pixel is sequentially decreased by $1/weight_{all}$, and the weight of the below pixel point obtained is sequentially increased by $1/weight_{all}$.

As shown in FIG. 7, pixel a is interpolated with pixels a1 and a2. When pixel a is interpolated, y=4, Y=3, $H/H_{red}$=16/8=2, $weight_{all}$=6, the weight of pixel a1 is 1/6 and that of pixel a2 is 5/6.

In the embodiments, since the original reference pixels are applied for interpolation, it is beneficial to improve the accuracy of interpolation for a small-sized coding block. However, for a large-sized coding block, since the current pixel located lower is far away from the original reference pixel, the interpolation accuracy may be reduced. Therefore, it may be considered whether to use the original reference pixel to participate in interpolation according to the size of the coding block. Selection may be made in any of the following ways.

When the area of the current coding block is smaller than a fourth threshold (Th4), the first reference pixel on the upper side of the second pixel in a different row may be selected as the upper-side interpolation pixels, otherwise the first reference pixel on the upper side of the second pixel in a different row is not selected as the upper-side interpolation pixels.

Alternatively, when the height of the current coding block is less than a fifth threshold (Th5), the first reference pixel on the upper side of the second pixel in a different row may be selected as the upper-side interpolation pixels, otherwise the first reference pixel on the upper side of the second pixel in a different row is not selected as the upper-side interpolation pixels.

In other embodiments, when performing vertical interpolation, not only the two pixels on the upper and lower sides of the current pixel may be applied for interpolation, but also a combination of an adjacent pixel on the left side of the current pixel may be applied. That is, 3 pixels may participate in the interpolation. The interpolation pixels corresponding to the second pixels in a different row further include a left-side interpolation pixel in a same row as the second pixel in a different row. The left-side interpolation pixel may be a first reference pixel or an adjacent pixel obtained on the left of the second pixel in a different row.

Similarly, the interpolation weights of the interpolation pixels may be configured according to the distances between the current pixel and the interpolation pixels. The closer the distance is, the greater the weight. When the distances are equal, the weights are equal.

Figure 8:
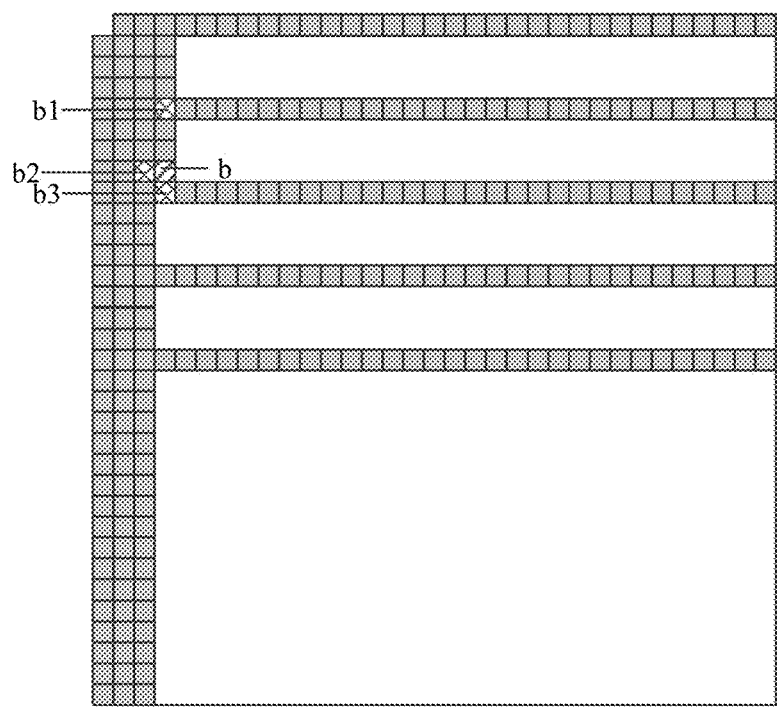
FIG. 8 is a schematic view of a linear interpolation according to a second embodiment of the present disclosure.

As shown in FIG. 2 and FIG. 8. FIG. 8 is a schematic view of a linear interpolation according to a second embodiment of the present disclosure. In some embodiments, the pixels b1, b2, and b3 are applied to interpolate the pixel b. When interpolating the pixel b, the total weight is $weight_{all}=2 \times (H/H_{red}-1)+1$, that is, $weight_{all}=2 \times (32/8-1)+1=7$. The weights of the pixel b3 and pixel b2 are both 3/7, and the weight of the pixel b1 is 1/7.

In the embodiments, the prediction accuracy may be improved, but part of the calculation amount is also increased. Therefore, it may be considered to decide whether to apply the original reference pixel to participate in the interpolation according to the size of the coding block. The selection may be made in any of the following ways.

When the area of the current coding block is smaller than a sixth threshold (Th6) or the height of the current coding block is smaller than a seventh threshold (Th7), the interpolation pixels may not include the left-side interpolation pixel, otherwise include.

When the width of the current coding block is smaller than an eighth threshold (Th8), the first reference pixel on the left of the second pixel in a different row is selected as the left-side interpolation pixels, otherwise not selected.

In other embodiments, on the basis of applying more reference interpolation pixels, the interpolation method may be improved to improve the operation efficiency.

It can be set that regardless of the position of the pixels to be interpolated, the upper-side interpolation pixels are all applied with the original reference pixels, and the left-side interpolation pixels are also applied with the original reference pixels. In this way, the operation efficiency may be improved.

In other embodiments, the vertical interpolation operation and the horizontal interpolation operation of the column to which the obtained pixel belongs may be performed in parallel to improve the operation efficiency.

The value of the first pixel and the value of the first reference pixel are horizontally interpolated to obtain the value of the second pixel in a same row, the second pixel in a same row being the second pixel in a same row as the first pixel. The value of the first pixel and the value of the first reference pixel are vertically interpolated to obtain the value of the second pixel in a same column, the second pixel in a same column being the second pixel in a same column as the first pixel.

The values of interpolation pixels of second pixel in a different row and a different column are applied to interpolate to obtain the value of the second pixel in a different row and a different column, the second pixel in a different row and a different column being another second pixel except the second pixel in a same row and the second pixel in a same column. The interpolation pixels include two second pixels in a same row that are closest to the second pixel in a different row and a different column in the vertical direction, and two second pixels in a same column that are closest to the second pixel in a different row and a different column in the horizontal direction.

Figure 9:
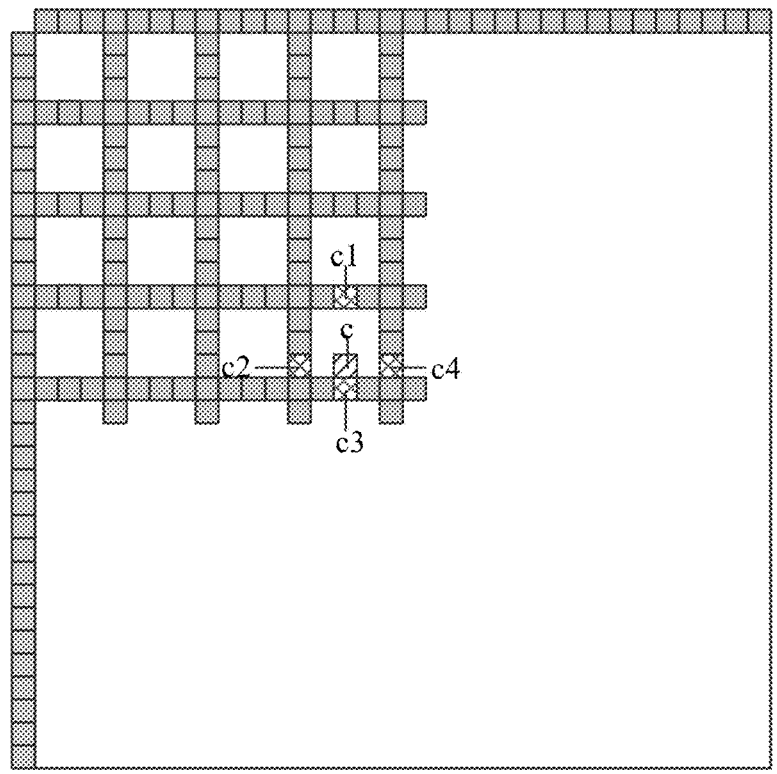
FIG. 9 is a schematic view of a linear interpolation according to a third embodiment of the present disclosure.

As shown in FIG. 9, FIG. 9 is a schematic view of a linear interpolation according to a third embodiment of the present disclosure.

The current coding block may be divided into small cells with a width of $W/W_{red}$ and a height of $H/H_{red}$. Each of pixels in each small cell are obtained by vertically mapping the pixel to 4 borders on the top, bottom, left and right of the cell, and interpolating. As shown in FIG. 9, pixels c1, c2, c3, and c4 may be applied to interpolate pixel c.

The interpolation weights may be assigned according to pixel distance. The closer the pixel distance is, the greater the weight is. When the pixel distances are equal, the weights are equal. As shown in FIG. 9, in some embodiments, the total weight of each small cell is $weight_{all}=H/H_{red}+W/W_{red}$. The weight of a specific interpolation pixel is obtained according to the pixel distance between the specific pixel and the desired pixel position by interpolation. As shown in FIG. 9, since the block is 32×32 in size, the total weight of each small cell is $weight_{all}=8$, the distance between pixel c2 and pixel c4 and pixel c is each 2, so the weight of the three pixel is each 2/8. The distance of pixel c3 is 1 and the weight thereof is 3/8. The distance of pixel c1 is 3 and the weight thereof is 1/8.

In other embodiments, two pixels in the horizontal direction and two pixels in the vertical direction may be weighted and averaged first, and interpolation weights may be assigned according to pixel distances. After calculating the two weighted average values of the horizontal and vertical two pixels, the two values are weighted and averaged, and weights may be arbitrarily assigned.

In some embodiments, the pixels c2 and c4 may be weighted and averaged first. The interpolation weights of pixels c2 and c4 are both ½, and the weighted average value is set to h. Then the pixels c1 and c3 are weighted and averaged. The weight of the pixel c1 is ¼, the weight of the pixel c3 is ¾, and the weighted average value is set to v. Finally, v and h are assigned weights, and weighted and averaged to obtain a final value. The weights may be arbitrarily assigned. For example, ⅓ weight is assigned to v and ⅔ weight is assigned to h. The value of pixel c is (v+2h)/3.

In the embodiments, the prediction accuracy may be improved, but part of the calculation amount is also increased. Therefore, it may be considered to decide whether to apply the foregoing solutions according to the size of the coding block. The selection may be made in any of the following ways.

When the area of the current coding block is less than a ninth threshold (Th9), or the height of the current coding block is less than a tenth threshold (Th10), or the width of the current coding block is less than an eleventh threshold (Th11), the interpolation pixels may not include the two pixels in a same column closest to the current pixel in the horizontal direction, otherwise interpolation pixels include the two pixels in a same column closest to the current pixel in the horizontal direction.

In the above embodiments, during linear interpolation, more reference pixels are applied for interpolation, such that the interpolation accuracy and the prediction accuracy may be improved. Moreover, the interpolation operation process is optimized to eliminate the pixel dependency during the interpolation operation, improving the operation efficiency.

It should be noted that, in all the above embodiments, the operations about determining the reference line, selecting the first reference pixel, down-sampling, calculating the value and linear interpolation, etc., may be combined in any different way without conflict.

Figure 10:
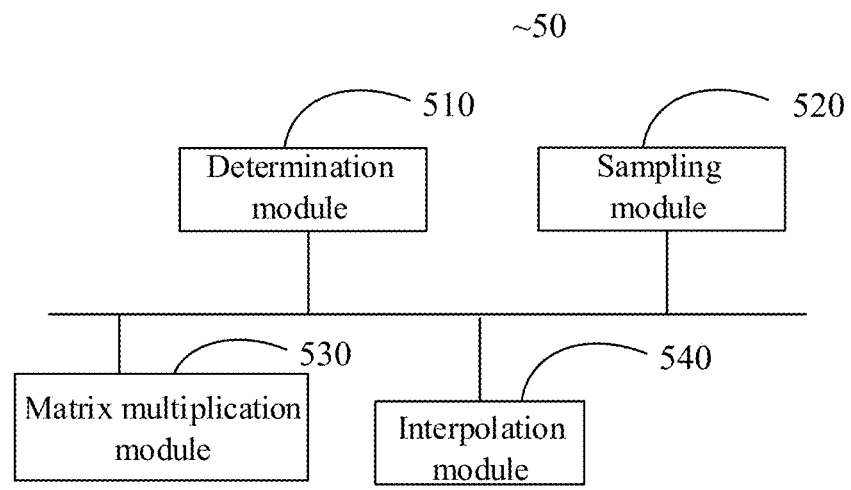
FIG. 10 is a structural schematic view of an intra-prediction device according to an embodiment of the present disclosure.

As shown in FIG. 10, FIG. 10 is a structural schematic view of an intra-prediction device according to an embodiment of the present disclosure. In the embodiment, the intra-prediction device 50 includes a determination module 510, a sampling module 520, a matrix multiplication module 530, and an interpolation module 540. The intra-prediction device may be configured to perform the intra-prediction method described in any of the above embodiments.

The determination module 510 is configured to determine at least one reference line of a current coding block, each reference line including a plurality of first reference pixels. The sampling module 520 is configured to down-sample each reference line to obtain a plurality of second reference pixels. The matrix multiplication module 530 is configured to perform a matrix multiplication based on the plurality of second reference pixels to obtain a reference matrix. The interpolation module 540 is configured to obtain a matrix-based intra-prediction block of the current coding block based on the reference matrix and the plurality of first reference pixels. The matrix-based intra-prediction block of the current coding block includes a plurality of first pixels and a plurality of second pixels. The value of the first pixel is the value of the pixel in the reference matrix. The value of the second pixel is obtained based on a calculation of the values of pixels in the reference matrix and the values of the first reference pixels.

Figure 11:
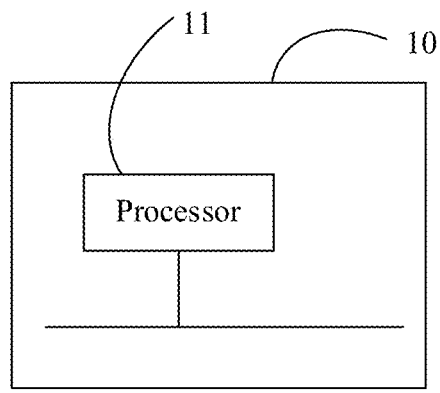
FIG. 11 is a structural schematic view of an encoder according to an embodiment of the present disclosure.

As shown in FIG. 11, FIG. 11 is a structural schematic view of an encoder according to an embodiment of the present disclosure. In the embodiment, an encoder 10 includes a processor 11.

The processor 11 may also be referred to as a central processing unit (CPU). The processor 11 may be an integrated circuit chip with signal processing capabilities. The processor 11 may also be a general-purpose processor, a digital signal processor (DSP), an application specific integrated circuit (ASIC), a field programmable gate array (FPGA) or other programmable logic devices, discrete gates or transistor logic devices, discrete hardware components. The general-purpose processor may be a microprocessor, or the processor 11 may also be any conventional processor or the like.

The encoder 10 may further include a memory (not shown in the figures) for storing instructions and data required for the processor 11 to operate.

The processor 11 is configured to execute instructions to implement the above-described intra-prediction method provided by any embodiment of the present disclosure and any non-conflicting combination.

Figure 12:
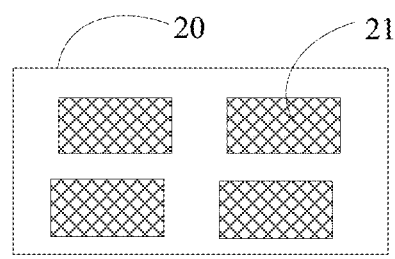
FIG. 12 is a structural schematic view of a storage medium according to an embodiment of the present disclosure.

As shown in FIG. 12, FIG. 12 is a structural schematic view of a storage medium according to an embodiment of the present disclosure. A computer-readable storage medium 20 is configured to store instructions or program data 21. When the instructions or program data 21 are executed, the intra-prediction method provided by any embodiment of the present disclosure and any non-conflicting combination is implemented. The instruction 21 may be configured to form a program file stored in the storage medium 20 in a form of a software product, such that a computer device (which may be a personal computer, a server, or a network device, etc.) or a processor executes all or part of the operations of the foregoing methods in any embodiment. The storage medium 20 includes: a U-disk, a mobile hard disk, a read-only memory (ROM), a random access memory (RAM), a magnetic disk, an optical disk, or other media which can store program codes, or terminal devices such as computers, servers, mobile phones, and tablets.

In the embodiments provided in the present disclosure, it should be understood that the disclosed system, device, and method may be implemented in other ways. For example, the device embodiments described above are only schematic. For example, the division of units is only a division of logical functions. In actual implementation, there may be other divisions. For example, multiple units or components may be combined or integrated to another system, or some features can be ignored, or not implemented. In addition, the displayed or discussed mutual coupling or direct coupling or communication connection may be indirect coupling or communication connection through some interfaces, devices or units, and may be in electrical, mechanical or other forms.

Moreover, each functional unit in each embodiment of the present disclosure may be integrated into one processing unit or may exist alone physically, or two or more units may be integrated into one unit. The above integrated unit may be implemented in the form of hardware or software functional unit.

The above description is for the purpose of illustrating implementations of the present disclosure, but not to limit the scope of the present disclosure. Any equivalent structural or process transformation performed based on the drawings and the specification of the present disclosure, applied directly and indirectly in other related art, should be within the scope of the present disclosure.

What is claimed is:

1. A method for intra-prediction, comprising:
   determining at least one reference line of a current coding block, each of the at least one reference line comprising a plurality of first reference pixels;
   down-sampling the at least one reference line and obtaining a plurality of second reference pixels;
   performing matrix multiplication for the plurality of second reference pixels and obtaining a reference matrix; and
   obtaining a matrix-based intra-prediction block of the current coding block based on the reference matrix and the plurality of first reference pixels, the matrix-based intra-prediction block comprising a plurality of first pixels and a plurality of second pixels, a value of each of the first pixels is a value of a corresponding pixel in the reference matrix, and a value of each of the second pixels is obtained based on values of the first pixels and values of the first reference pixels;
   wherein the down-sampling with multiple reference lines and obtaining a plurality of second reference pixels comprises:
   dividing the plurality of first reference pixels into a plurality of groups in each of the plurality of reference lines; wherein the plurality of reference lines comprises at least a first reference line and a second reference line, and the number of the plurality of first reference pixels of the first reference line is same as the number of the plurality of first reference pixels of the second reference line in the each group; and the plurality of first reference pixels of each of the reference line are continuously distributed; and
   obtaining a value of the corresponding second reference pixel, the value of the corresponding second reference pixel being a weighted average value of values of first reference pixels in the each group.

2. The intra-prediction method according to claim 1, wherein the first reference pixels in the each group have a same weight; or
   a weight of each of the first reference pixels in the each group is inversely correlated with a distance between the each of the first reference pixels in the each group and a specified pixel; or
   a weight of one first reference pixel of the first or second reference line is same as that another first reference pixel of the first or second reference line, and a weight of each first reference pixel of the first or second reference line is inversely correlated with a distance between the first or second reference line and the current coding block; or
   a weight of each first reference pixel of the first or second reference line is inversely correlated with a distance between the each first reference pixel and a specified pixel, a weight of the first reference line is same as that of the second reference line, and a weight of each reference line of the at least one reference line is a sum of weights of all first reference pixels of the each reference line in the each group; or
   a weight of each first reference pixel of the first or second reference line is inversely correlated with a distance between the each first reference pixel and a specified pixel, and a weight of each reference line of the at least one reference line is inversely correlated with a distance between the each reference line and the current coding block.

3. The intra-prediction method according to claim 2, wherein the specified pixel is one that is located at the rightmost of the each reference line in each group, when first reference pixels of the each reference line in the each group are located in a horizontal direction;
   the specified pixel is one that is located at the lowermost of the each reference line in each group, when first reference pixels of the each reference line in the each group are located in a vertical direction.

4. The intra-prediction method according to claim 1, wherein the determining at least one reference line of a current coding block comprises:
  determining the number of the at least one reference line based on a size of the current coding block.

5. The intra-prediction method according to claim 4, wherein in response to an area of the current coding block being less than a first threshold, the number of the at least one reference line is 1, or
  in response to the area of the current coding block being greater than or equal to the first threshold, the number of the at least one reference line is greater than 1.

6. The intra-prediction method according to claim 4, wherein in response to a width of the current coding block being less than a second threshold, the number of the at least one reference line at a left side of the current coding block is 1, or in response to the width of the current coding block being greater than or equal to the second threshold, the number of the at least one reference lines at the left side of the current coding block is greater than 1;
  in response to a height of the current coding block being less than a third threshold, the number of the at least one reference line at a top-side of the current coding block is 1, or in response to the height of the current coding block being greater than or equal to the third threshold, the number of the at least one reference line at the top-side of the current coding block is greater than 1.

7. The intra-prediction method according to claim 1, wherein the obtaining a matrix-based intra-prediction block of the current coding block based on the reference matrix and the plurality of first reference pixels comprises:
  performing horizontal interpolation for a value of one second pixel of the second pixels based on a value of one first pixel of the first pixels and a value of one first reference pixel, the one second pixel being located in a row same as that the one first pixel is located in; and
  performing interpolation for a value of another second pixel of the second pixels based on a set of value of a set of interpolation pixels of the another second pixel, after obtaining the set of value of the set of interpolation pixels, the another second pixel being located in a row different from that the one first pixel is located in.

8. The intra-prediction method according to claim 7, wherein the set of interpolation pixels of the another second pixel comprises an upper-side interpolation pixel and a lower-side interpolation pixel; the upper-side interpolation pixel and the lower-side interpolation pixel are located in a same column as that the another second pixel is located in.

9. The intra-prediction method according to claim 8, wherein the upper-side interpolation pixel is one of the first reference pixels that is located at an upper side of the another second pixel, an obtained closest first pixel of the first pixels or the one second pixel, or an obtained adjacent pixel; and
  the lower-side interpolation pixel is an obtained closest first pixel of the first pixels or the one second pixel that is located at a lower side of the another second pixel, or an adjacent pixel obtained.

10. The intra-prediction method according to claim 8, before the performing interpolation for a value of another second pixel of the second pixels based on a set of value of a set of interpolation pixels of the another second pixel, further comprising:
  in response to an area of the current coding block being less than a fourth threshold, selecting the one of the first reference pixels that is located at an upper side of the another second pixel as the upper-side interpolation pixel;
  in response to the area of the current coding block being greater than or equal to the fourth threshold, unselecting the one of the first reference pixels that is located at an upper side of the another second pixel as the upper-side interpolation pixel.

11. The intra-prediction method according to claim 8, before the performing an interpolation based on the values of the interpolation pixels of the second pixels in a different row to obtain the values of the second pixels in a different row, further comprising:
  in response to a height of the current coding block being less than a fifth threshold, selecting the one of the first reference pixels that is located at an upper side of the another second pixel as the upper-side interpolation pixel;
  in response to the height of the current coding block being greater than or equal to the fifth threshold, unselecting the one of the first reference pixels that is located at an upper side of the another second pixel as the upper-side interpolation pixel.

12. The intra-prediction method according to claim 8, wherein the set of interpolation pixels of the another second pixel further comprises a left-side interpolation pixel that is located in a same row as that the another second pixel is located in; the left-side interpolation pixel is one of the first reference pixels that is located at a left side of the another second pixel or an obtained adjacent pixel.

13. The intra-prediction method according to claim 12, wherein
  the left-side interpolation pixel is included in response to an area of the current coding block being greater than or equal to a sixth threshold or a height of the current coding block being greater than or equal to a seventh threshold.

14. The intra-prediction method according to claim 13, before the performing interpolation for a value of another second pixel of the second pixels based on a set of value of a set of interpolation pixels of the another second pixel, further comprising:
  in response to a width of the current coding block being less than an eighth threshold, selecting the one of the first reference pixels that is located at the left side of the another second pixel as the left-side interpolation pixel;
  in response to the width of the current coding block being greater than or equal to the eighth threshold, unselecting the one of the first reference pixels that is located at the left side of the another second pixel as the left-side interpolation pixel.

15. The intra-prediction method according to claim 1, wherein the obtaining a matrix-based intra-prediction block of the current coding block based on the reference matrix and the plurality of first reference pixels comprises:
  performing horizontal interpolation for a value of one second pixel of the second pixels based on a value of one first pixel of the first pixels and a value of one first reference pixel, and performing vertical interpolation for a value of another second pixel of the second pixels based on the value of the one first pixel of the first pixels and the value of the one first reference pixel, the one second pixel being located in a row same as that the one first pixel is located in, and the another second pixel being located in a column same as that the one first pixel is located in; and performing interpolation for a value of yet another second pixel of the second pixels based on a set of value of a set of interpolation pixels of the yet another second pixel, the yet another second pixel being located in a row different from that the one first pixel is located in and in a column different from that the one first pixel is located in; wherein the set of interpolation pixels comprises two second pixels of the second pixels in a vertical direction and another two second pixels of the second pixels in a horizontal direction, the two second pixels being located in a row same as that the one first pixel is located in, and the another two second pixels being located in a column same as that the one first pixel is located in.

16. The intra-prediction method according to claim 15, wherein the another two second pixels of the second pixels in the horizontal direction is included in response to an area of the current coding block being greater than or equal to a ninth threshold, or a height of the current coding block being greater than or equal to a tenth threshold, or a width of the current coding block being greater than or equal to an eleventh threshold.

17. An encoder, comprising a processor for executing instructions to perform:

determining at least one reference line of a current coding block, each of the at least one reference line comprising a plurality of first reference pixels;

down-sampling the at least one reference line and obtaining a plurality of second reference pixels;

performing matrix multiplication for the plurality of second reference pixels and obtaining a reference matrix; and obtaining a matrix-based intra-prediction block of the current coding block based on the reference matrix and the plurality of first reference pixels, the matrix-based intra-prediction block comprising a plurality of first pixels and a plurality of second pixels, a value of each of the first pixels is a value of a corresponding pixel in the reference matrix, and a value of each of the second pixels is obtained based on values of the first pixels and values of the first reference pixels;

wherein the down-sampling with multiple reference lines and obtaining a plurality of second reference pixels comprises:

dividing the plurality of first reference pixels into a plurality of groups in each of the plurality of reference lines; wherein the plurality of reference lines comprises at least a first reference line and a second reference line, and the number of the plurality of first reference pixels of the first reference line is same as the number of the plurality of first reference pixels of the second reference line in the each group; and the plurality of first reference pixels of each of the reference line are continuously distributed; and obtaining a value of the corresponding second reference pixel, the value of the corresponding second reference pixel being a weighted average value of values of first reference pixels in the each group.

18. A computer-readable storage medium, storing instructions or program data to be executed to perform a method for intra-prediction, wherein the method comprises:

determining at least one reference line of a current coding block, each of the at least one reference line comprising a plurality of first reference pixels;

down-sampling the at least one reference line and obtaining a plurality of second reference pixels;

performing matrix multiplication for the plurality of second reference pixels and obtaining a reference matrix; and obtaining a matrix-based intra-prediction block of the current coding block based on the reference matrix and the plurality of first reference pixels, the matrix-based intra-prediction block comprising a plurality of first pixels and a plurality of second pixels, a value of each of the first pixels is a value of a corresponding pixel in the reference matrix, and a value of each of the second pixels is obtained based on values of the first pixels and values of the first reference pixels;

wherein the down-sampling with multiple reference lines and obtaining a plurality of second reference pixels comprises:

dividing the plurality of first reference pixels into a plurality of groups in each of the plurality of reference lines; wherein the plurality of reference lines comprises at least a first reference line and a second reference line, and the number of the plurality of first reference pixels of the first reference line is same as the number of the plurality of first reference pixels of the second reference line in the each group; and the plurality of first reference pixels of each of the reference line are continuously distributed; and obtaining a value of the corresponding second reference pixel, the value of the corresponding second reference pixel being a weighted average value of values of first reference pixels in the each group.

* * * * *